United States Patent
McCauley et al.

(10) Patent No.: US 9,751,811 B1
(45) Date of Patent: Sep. 5, 2017

(54) GRAPHITE BLENDING METHOD FOR CERAMIC SHRINKAGE CONTROL

(71) Applicant: Corning Incorporated, Corning, NY (US)

(72) Inventors: Daniel Edward McCauley, Horseheads, NY (US); Anthony Nicholas Rodbourn, Avoca, NY (US); Patrick David Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/990,306

(22) Filed: Jan. 7, 2016

Related U.S. Application Data

(63) Continuation of application No. 13/687,176, filed on Nov. 28, 2012, now abandoned.

(51) Int. Cl.
  *C04B 38/00* (2006.01)
  *C04B 38/06* (2006.01)
  *C04B 35/478* (2006.01)

(52) U.S. Cl.
  CPC ........ *C04B 38/0006* (2013.01); *C04B 35/478* (2013.01); *C04B 38/06* (2013.01); *C04B 2235/425* (2013.01); *C04B 2235/6021* (2013.01); *C04B 2235/9615* (2013.01)

(58) Field of Classification Search
  CPC ............ C04B 38/068; C04B 2235/425; C04B 2235/5472; C04B 38/0006; C04B 38/06; B28B 17/0072
  See application file for complete search history.

(56) References Cited

U.S. PATENT DOCUMENTS

| | | |
|---|---|---|
| 8,591,623 B2 | 11/2013 | Beall et al. |
| 9,005,517 B2 | 4/2015 | Bronfenbrenner |
| 2010/0052200 A1 | 3/2010 | Deneka et al. |

(Continued)

FOREIGN PATENT DOCUMENTS

| | | |
|---|---|---|
| JP | 2011514876 A | 5/2011 |
| JP | 2011515309 A | 5/2011 |

OTHER PUBLICATIONS

"Kaizen". [online] [retrieved Nov. 17, 2011] Retrieved from: http://web.archive.org/web/20111117060422/http://en.wikipedia.org/wiki/Kaizen.

(Continued)

*Primary Examiner* — Erin Snelting
(74) *Attorney, Agent, or Firm* — Joseph M. Homa; John L. Haack

(57) ABSTRACT

A method for green-to-fired shrinkage control in honeycomb ceramic article manufacture, including:
  measuring, prior to mixing, the particle size distribution properties of at least one fine particle size graphite pore former ingredient of a provided ceramic source batch mixture;
  calculating the expected shrinkage of the green body to the fired ceramic article based on the measured particle size distribution properties of the at least one fine particle graphite pore former;
  making the honeycomb ceramic article;
  measuring the shrinkage of the resulting fired honeycomb ceramic article; and
  adjusting the ceramic source batch mixture in a subsequent batch material schedule, as defined herein, wherein the adjusted ceramic source batch mixture provides finished honeycomb ceramic articles having controlled green-to-fired shrinkage.

10 Claims, 6 Drawing Sheets

(56) References Cited

U.S. PATENT DOCUMENTS

2011/0045233 A1    2/2011   Gray et al.
2011/0053757 A1    3/2011   Caffery et al.
2012/0049419 A1    3/2012   Eicher et al.

OTHER PUBLICATIONS

International Search Report of the International Searching Authority; PCT/US2013/071398; Mailed Mar. 13, 2014; European Patent Office, 10 pages.
CN201380061810.1 Chinese First Office Action Dated May 30, 2016; 6 Pages; Chinese Patent Office.
CN201380061810.1 Chinese Second Office Action Dated Jan. 17, 2017, China Patent Office, 8 pages.
JP2015544143 Office Action Dated Jan. 31, 2017, Japan Patent Office, 3 pages.

GRAPHITE BLENDING METHOD FOR CERAMIC SHRINKAGE CONTROL

CROSS-REFERENCE TO RELATED APPLICATIONS

This application is a continuation of U.S. application Ser. No. 13/687,176, filed on Nov. 28, 2012, entitled "GRAPHITE BLENDING METHOD FOR CERAMIC SHRINKAGE CONTROL," the content of which is relied upon and incorporated herein by reference in its entirety.

BACKGROUND

The disclosure relates to a method for controlling shrinkage during firing in ceramic article manufacture.

SUMMARY

The disclosure provides a method for controlling shrinkage of ceramic articles, such as honeycomb filters, during firing of a green body to the ceramic article.

In embodiments, the disclosure provides a method for green-to-fired shrinkage control in honeycomb ceramic article manufacture, including:

measuring, prior to mixing, the particle size distribution properties of at least one fine particle size graphite pore former ingredient of a provided ceramic source batch mixture;

calculating the expected shrinkage of the green body to the fired ceramic article based on the measured particle size distribution properties of the at least one fine particle graphite pore former;

making the honeycomb ceramic article;

measuring the shrinkage of the resulting fired honeycomb ceramic article; and adjusting the ceramic source batch mixture in a subsequent batch material schedule, as defined herein, wherein the adjusted ceramic source batch mixture provides finished honeycomb ceramic articles having controlled green-to-fired shrinkage.

BRIEF DESCRIPTION OF DRAWINGS

In embodiments of the disclosure.

DETAILED DESCRIPTION

Figure 1:
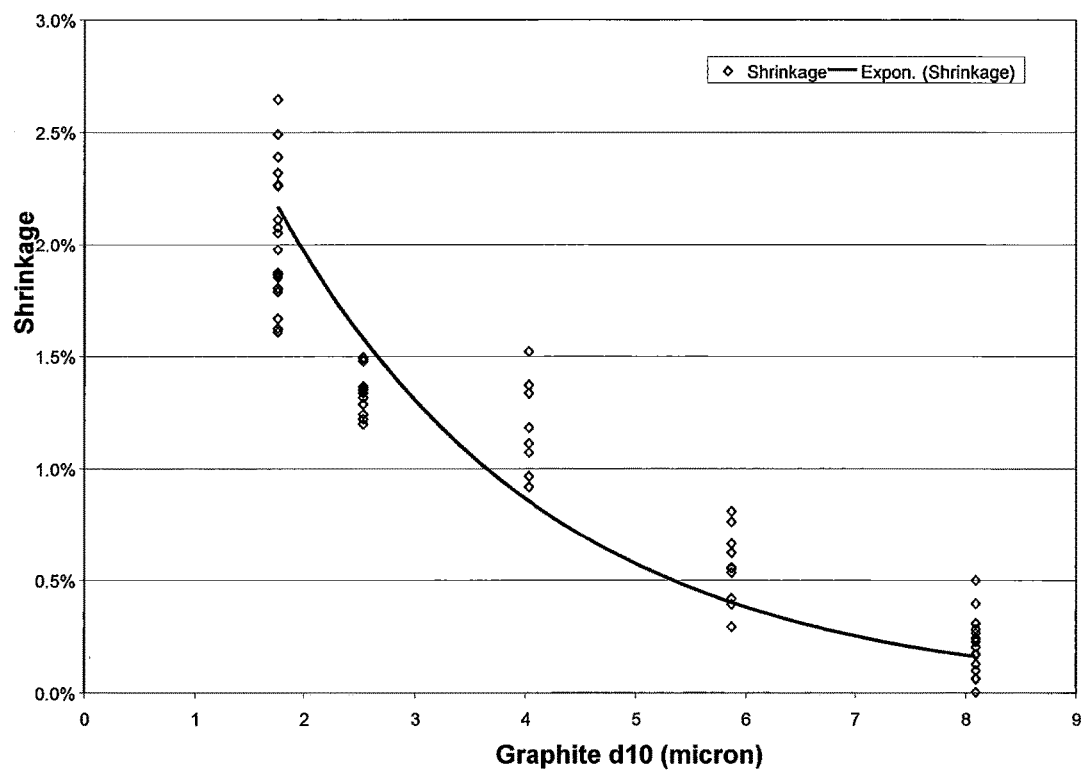
FIG. 1 illustrates the effect of the fine end of the graphite distribution on green-to-fired shrinkage.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed apparatus, and the disclosed method of making provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The methods of the disclosure can include any value or any combination of the values, specific values, more specific values, and preferred values, including intermediate values and ranges, described herein.

The ability to produce extrude-to-shape diesel particulate filter (DPF) articles can depend on the ability to minimize variability in the amount the filter shrinks (or grows) during the firing process. Dimensional tolerances being implemented in the industry are narrowing and so is the acceptable shrinkage variation. Graphite pore-former particle size distribution (PSD), especially the fine end of that distribution, has been identified as a significant factor in shrinkage and shrinkage variability. Generally, the larger the population of small particles of graphite pore-former present, for example in wt %, the more the fired ceramic article or part will shrink. The very fine pores created by the graphite pore-former eventually sinter away during the firing process. Variability in the fine end of the distribution directly leads to more shrinkage variation. Additional details on this phenomenon and subsequent control strategy have been disclosed in commonly owned and assigned U.S. patent application Ser. No. 12/395,005, now U.S. Patent Application Publication No. 2010/0052200. The commonly owned and assigned Application disclosed a single graphite pore former and did not mention an iterative property control method.

Graphite has been either all or part of the pore former package for commercial diesel particle filter (DPF) compositions as a fugitive pore former in the past but has been limited to a single grade within a given composition. This present disclosure provides a method involving blending a fine particle size graphite pore former with a coarse particle size pore forming graphite, in varying amounts, so as to stabilize the naturally occurring shrinkage variability due to upstream PSD variability of all of the other batch raw materials that may impact shrinkage. The PSD of the added fine graphite component must be a fine enough grade to produce pores that will completely sinter away in the firing process. The fine particle size graphite completely sinters away and permits control of ceramic article shrinkage variability without impacting other physical or chemical properties.

In embodiments, the present disclosure provides a method for green-to-fired shrinkage control in honeycomb ceramic article manufacture, comprising:

measuring, prior to mixing, the particle size distribution properties of at least one fine particle graphite pore former ingredient of a provided ceramic source batch mixture;

calculating the expected shrinkage of the green body to the fired ceramic article based on the measured particle size distribution properties of the at least one fine particle graphite pore former;

making the honeycomb ceramic article comprising:
preparing an extruded green body from the provided ceramic source batch mixture having the at least one fine particle graphite pore former having the measured particle size distribution properties; and
firing the extruded green body to form the honeycomb ceramic article;

measuring the shrinkage of the resulting fired honeycomb ceramic article; and adjusting the ceramic source batch mixture in a subsequent batch material schedule according to:
if the measured shrinkage is greater than about 0.15 relative % positive deviation from the calculated expected shrinkage, then subtract 0.5 wt % from the fine particle size graphite content; or
if the measured shrinkage is greater than about 0.15 relative % negative deviation from the calculated expected shrinkage then add 0.5 wt % to the fine particle size graphite content.

In embodiments, the method can include or further comprise, for example, extruding the adjusted batch mixture to form an extruded green body; and firing the extruded green body to form the ceramic article having controlled shrinkage properties.

In embodiments, the controlled shrinkage can be, for example, less than about +0.15 relative % to about −0.15 relative % difference compared to the expected shrinkage.

In embodiments, the measured shrinkage of the fired honeycomb ceramic article measures a change in at least one of: the diameter of the article, the major axis of the article, or a combination thereof.

In embodiments, the at least one fine particle size graphite comprises a particle size distribution having a d50 of 3 to 5 microns, and a d90 less than 8 microns.

In embodiments, calculating the expected shrinkage (dS) of the green body to the fired ceramic article can be accomplished, for example, according to the formula:

$$dS = dFG/A$$

where dS the expected shrinkage if the fine graphite is held constant, dFG is the change in the amount of the at least one fine particle size graphite in the batch mixture, and A is a scale factor which depends on the other batch components and the attributes of the fine particle size graphite selected.

In embodiments, the provided ceramic source batch mixture can have a shrinkage variability of from about +0.5% to about −0.5% from a nominal value over a short term, intermediate term, or long term production period, for example, from about 1 month to 5 years, from about 2 months to 4 years, from about 3 months to 2 years, and like intervals, including intermediate values and ranges.

In embodiments, aluminum titanate based compositions are provided that can have a porosity of, for example, from 43% to 65%, and can have a web thickness of, for example, from 9 mil to 14 mil.

In embodiments, the ceramic source batch mixture having the at least one fine particle size graphite pore former can further include, for example, at least one of:
an aluminum oxide source;
a silica source;
a titanium oxide source;
a lanthanum oxide source;
a starch containing pore former;
a coarse graphite pore former;
and mixtures thereof.

In embodiments, the method can further comprise, for example, verifying the stability of the method of making the ceramic article over time, for example, from batch-to-batch, from day-to-day, week-to-week, month-to-month, year-to-year, and like useful time intervals. If the method of making is satisfactorily stable with respect to shrinkage control or tolerable article shrinkage, and the raw materials are satisfactorily consistent, then relying on the previously determined batch sheet or penultimate batch sheet for use in the next or subsequent batch material schedule. In one specific illustrative example:

if the expected shrinkage, for example based on measuring the fine particle size graphite pore former ingredient, is neither greater than positive 0.15 relative % or greater than negative 0.15 relative % of the penultimate (i.e., previous or one before the last) calculated expected shrinkage, then use the penultimate batch sheet for the next batch material schedule. (i.e., null adjustment or "in spec" production, when, for example, there is insufficient variability in the shrinkage property to merit an adjustment in the fine particle size graphite pore former content.)

In embodiments, the present disclosure provides a method for green-to-fired shrinkage control in honeycomb ceramic article manufacture, comprising:

determining the green-to-fired shrinkage of a green body when fired to a fired ceramic article, wherein the green body is prepared from a ceramic source batch mixture having the at least one fine particle graphite pore former having a measured particle size distribution;

comparing the determined green-to-fired shrinkage of the resulting fired ceramic article with an expected shrinkage in the fired ceramic, wherein the expected shrinkage of the fired ceramic has a positive deviation or negative deviation of less than 0.15 relative %;

adjusting the weight % of the at least one fine particle graphite pore former having the measured particle size distribution in the ceramic source batch mixture if the determined green-to-fired shrinkage is greater than the expected shrinkage; and firing the green body to form the honeycomb ceramic article having controlled shrinkage.

In embodiments, the controlled shrinkage of the honeycomb ceramic article can be, for example, a shrinkage deviation of less than about 0.15 relative %.

In embodiments, adjusting the weight % of the at least one fine particle graphite pore former comprises adding or subtracting graphite pore former from the batch schedule in an amount of about 0.5 weight % to about 5 wt % or more, such as 0.6, 0.7, 0.8, 0.9, 1.0, 1.1, 1.2, 1.3, 1.4, 1.5, 1.6, 1.7, 1.8, 1.9, 2.0 wt %, or more, including intermediate values and ranges.

In embodiments, the at least one fine particle graphite pore former can comprise a mixture of two or more fine particle graphite pore formers having different measured particle size distributions.

In embodiments, the ceramic source batch mixture can further comprise at least one of a coarse particle size graphite pore former, alone or in combination with a fine particle size graphite pore former or with another non-graphite pore former.

In embodiments, the pore former can further comprise a mixture of two or more graphite pore formers having different measured particle size distributions, such as a mixture of a fine graphite pore former and coarse graphite pore former.

In embodiments, the pore former can further comprise a mixture of one or more graphite pore formers and one or more non-graphite pore formers, such as pea starch or like non-graphite pore formers. The pore formers can have, for example, the same or different measured particle size distributions.

In embodiments, adjusting the weight % of the at least one fine particle graphite pore former in the above mentioned source batch mixture can be accomplished is according to, for example:

if the expected shrinkage is more negative than about negative 0.15 relative %, then adding fine particle size graphite to the batch schedule; or if the expected shrinkage is more positive than about positive 0.15 relative %, then subtracting fine particle size graphite from the batch schedule; and if the expected shrinkage is less negative than about negative 0.15 relative % or less positive than about positive 0.15 relative %, then maintaining the fine particle size graphite content in the batch schedule at a constant level.

In embodiments, adjusting the weight % of the at least one fine particle graphite pore former can comprise, for example, adding or subtracting graphite pore former from the batch schedule in an amount of about 0.5 weight % to about 2.5 weight %.

In embodiments, "consisting essentially of" can refer to, for example:

a method for shrinkage property control in ceramic article manufacture, such as honeycomb filters, including:

characterizing at least one of a mixture of ceramic source batch materials, including a fine particle size graphite pore former, such as the particle size distribution of the graphite pore former;

calculating the expected shrinkage (i.e., to determine, for example, the predicted shrinkage) in the fired ceramic made from the ceramic source batch materials; and adjusting the source batch materials according to:
if the expected shrinkage is greater than about a positive 0.15 relative percent ("rel %"), then subtract 0.5 wt % of the fine particle size graphite content from the batch material schedule; or if the expected shrinkage is more negative than about a negative 0.15 rel % then add 0.5 wt % of the fine particle size graphite content to the batch material schedule; and extruding and firing the batch materials to obtain a honeycomb ceramic article having controlled shrinkage of about 0.15 rel % shrinkage or less shrinkage.

In embodiments, the disclosure provides a method for controlling shrinkage and controlling shrinkage variability in graphite containing diesel particle filter (DPF) batch compositions by adding or removing specified amounts of the fine particle size (e.g., d50 3 less than or equal to 5 microns, such as 3 to 5 microns, d90 less than 8 microns), graphite component from the batch materials.

In embodiments, the disclosed method, in combination with the knowledge and understanding of the shrinkage of the fired article, can provide a manufacturing process that can continuously extrude a constant size green body honeycomb structure.

Shrinkage variability over the time, such as many days or weeks of production, can be greatly reduced using the disclosed iterative graphite blending method along with the knowledge of the shrinkage shifts caused by other raw materials. When shrinkage variability is relatively constant over the time, the shrinkage property can be purposely altered by, for example, changing the weight percent of one or more batch ingredients, such as the fine particle size graphite content, or other ingredients of the batch.

In embodiments, the disclosed method provides a significant reduction in the shrink mask skin former hardware called for to produce satisfactory product and provides significant tooling cost savings.

In embodiments, the disclosed method permits honeycomb skin finishing to move from a shrink mask skin former type system to a die cut skin former system or other skin finishing methods. A die cut skin former system has numerous advantages including, for example, reducing skin related defects such as collapsed cells, air checks, skin fissures, and enables a variety of other known skin forming technologies to be used. By facilitating the use of more advanced skin technologies, skin finish defects can be reduced.

In embodiments, the disclosed shrinkage control and blending method minimizes the impact of variations in the physical properties of batch materials on the performance of batch extrusion and the resulting extruded, dried, and fired honeycomb structures.

Referring to the Figures, FIG. 1 shows the fine end of the graphite pore-former particle size distribution curve ($d_{10}$) and the fine end can have a significant impact on the fired shrinkage of, for example, an aluminum titanate (AT) body. FIG. 1 illustrates the effect of the fine end of the graphite distribution on green-to-fired shrinkage.

Figure 2:
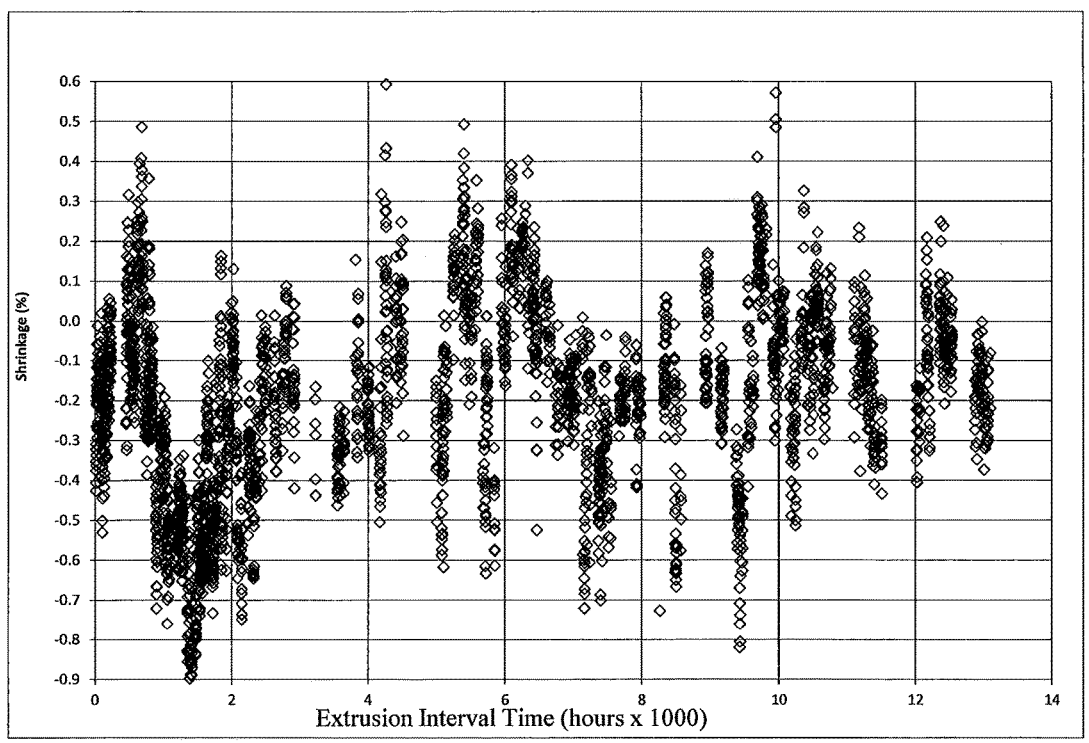
FIG. 2 illustrates a time series of filter shrinkage observed for numerous runs over an extended period of about 1.5 years.

FIG. 2 illustrates a time series of filter shrinkage (or growth) in relative % (y-axis) observed for numerous runs over an extended extrusion interval time in hours×1000 (x-axis) of about 13,000 hours or about 1.5 years. Previous work investigating the graphite/shrinkage relationship focused on getting consistent graphite pore former to minimize variability in firing shrinkage (McCauley, et al., see copending U.S. patent application Ser. No. 12/395,005, now U.S. Patent Application Publication No. 2010/0052200). The prior approach dynamically changed the amount of graphite in the green body to change the firing shrinkage properties, and compensated for natural shrinkage variability seen in the body and which variability is also seen in FIG. 2. The x-axis represents the extrusion interval time (in hours×1,000), that is for example, 0 to 14 hours (×1,000) in 2 hour (×1,000) increments, or about 13,000 hours of data accumulated over about 1.5 years.

Figure 3:
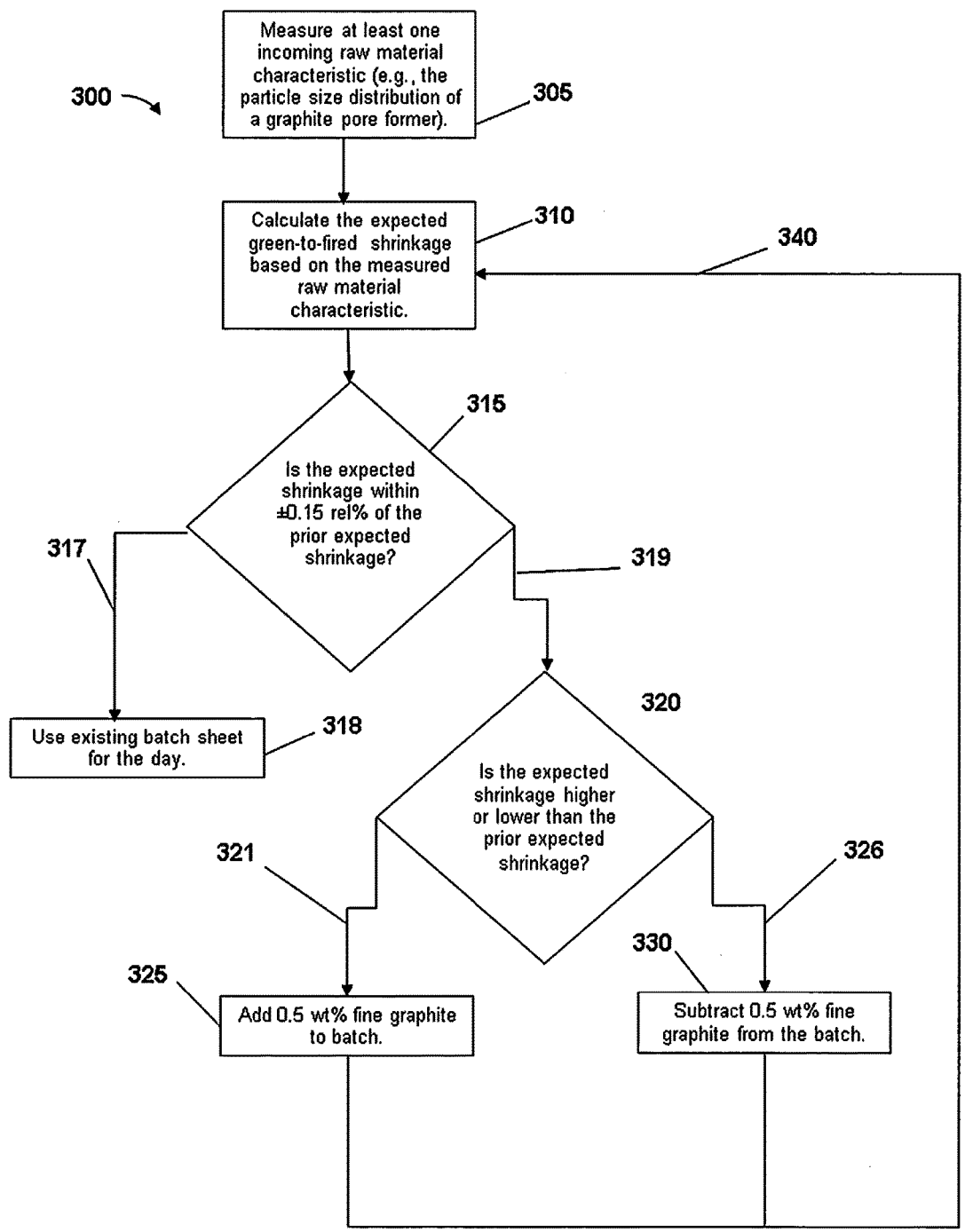
FIG. 3 illustrates an exemplary decision tree for filter shrinkage control via secondary fine graphite addition.

FIG. 3 illustrates an exemplary decision tree for filter shrinkage control via secondary fine graphite addition or subtraction. In embodiments, the steps of the disclosed process can follow the illustrated decision tree (300), for example: First, measure at least one characteristics of the incoming raw materials (305), such as the particle size distribution of a graphite pore former. Second, calculate the expected green-to-fired shrinkage based on the measured raw material characteristic (310). Third, query "Is the expected shrinkage within ±0.15 rel % of the prior expected shrinkage?" (315). If the answer to the expected shrinkage question (315) is "Yes" (317), then use the existing batch sheet for the next production batch (318)(i.e., null adjustment). If the answer to the expected shrinkage question (315) is "No" (319), then query "Is the expected shrinkage higher or lower than the prior expected shrinkage?" (320). If the answer to the penultimate (e.g., a previous production day) shrinkage prediction question (320) is "Lower" (321), then "Add 0.5 wt % fine graphite to batch." (325). However, if the answer to the penultimate (e.g., a previous production day) shrinkage prediction question (320) is "Higher" (326), then "Subtract 0.5 wt % fine graphite to batch" (330). Next, the fine particle size graphite addition (325) or fine graphite subtraction (330) directive is accomplished in the batch formulation, followed by honeycomb green body extrusion, and firing the green body steps. The resulting fired articles or wares can be analyzed for porosity, or other properties, and the measured porosity property information can be used in the subsequent calculations to iteratively (340) further refine the green-to-fired shrinkage behavior and shrinkage properties.

Figure 4:
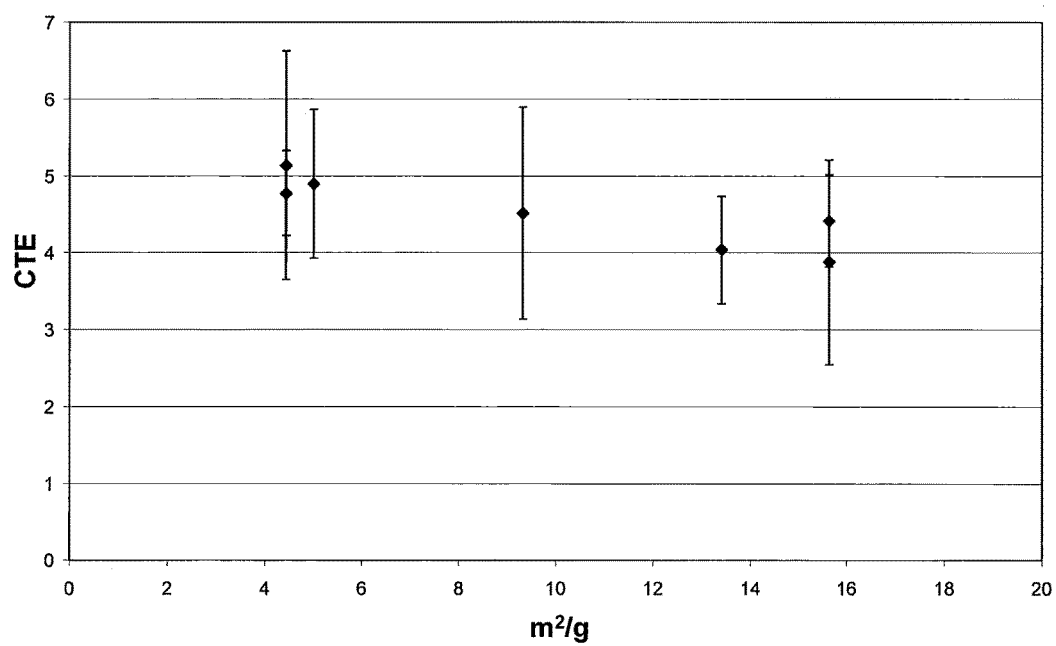
FIG. 4 illustrates the relationship between the graphite surface area (SA in meters squared per gram), which is analogous to particle size in graphite, to the co-efficient of thermal expansion (CTE) of the fired ceramic.

FIG. 4 illustrates the relationship between graphite surface area (SA in meters squared per gram), which is analogous to particle size in graphite, to the co-efficient of thermal expansion (CTE) of the fired ceramic. This figure also shows that CTE is unchanged over a wide range of graphite surface areas or particle sizes.

Figure 5:
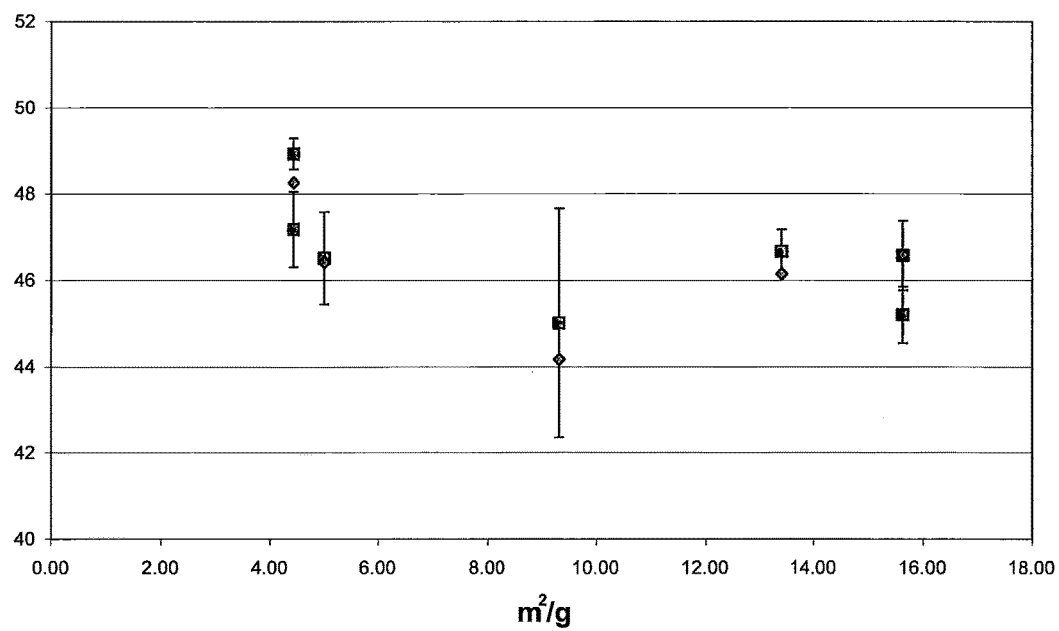
FIG. 5 illustrates the relationship between surface area (SA), which is analogous to particle size in graphite, to % porosity tested at two different field locations indicated by the respect squares and diamonds.

FIG. 5 illustrates the relationship between surface area (SA), which is analogous to particle size in graphite, to % porosity tested at two different field locations indicated by the respective squares and diamonds. This figure also shows that % porosity is essentially unchanged over a wide range of graphite surface area particles sizes.

Figure 6A:
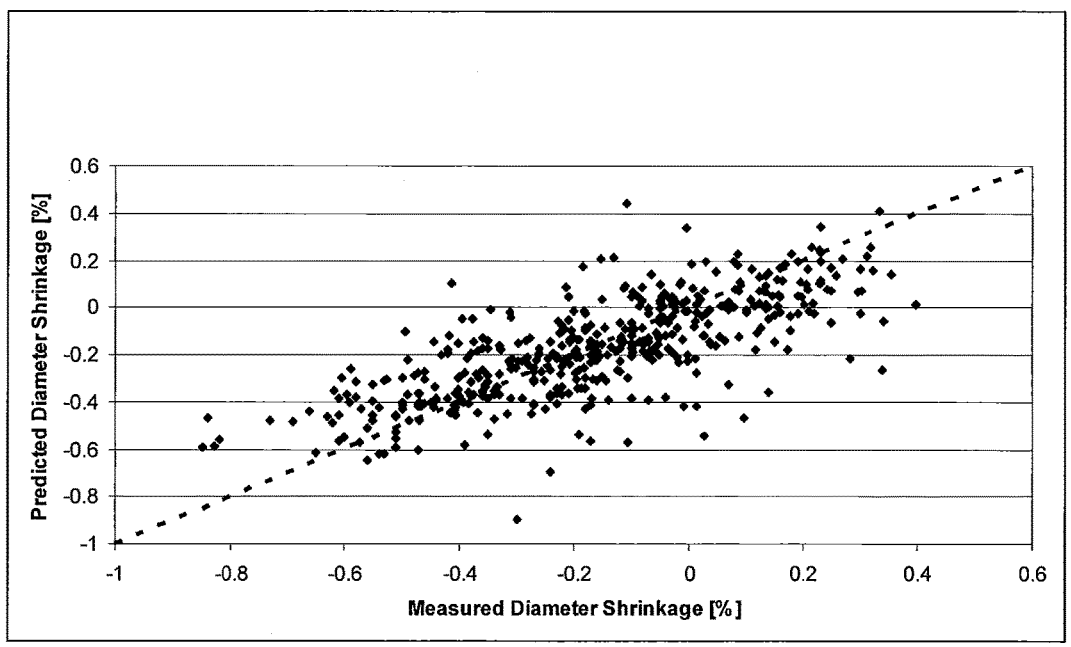
FIGS. 6A and 6B, graphically illustrates the relation of the predicted diameter shrinkage of the fired ceramic article using classical regression and neural network methods, respectively compared to actual measured diameter shrinkage.
Figure 6B:
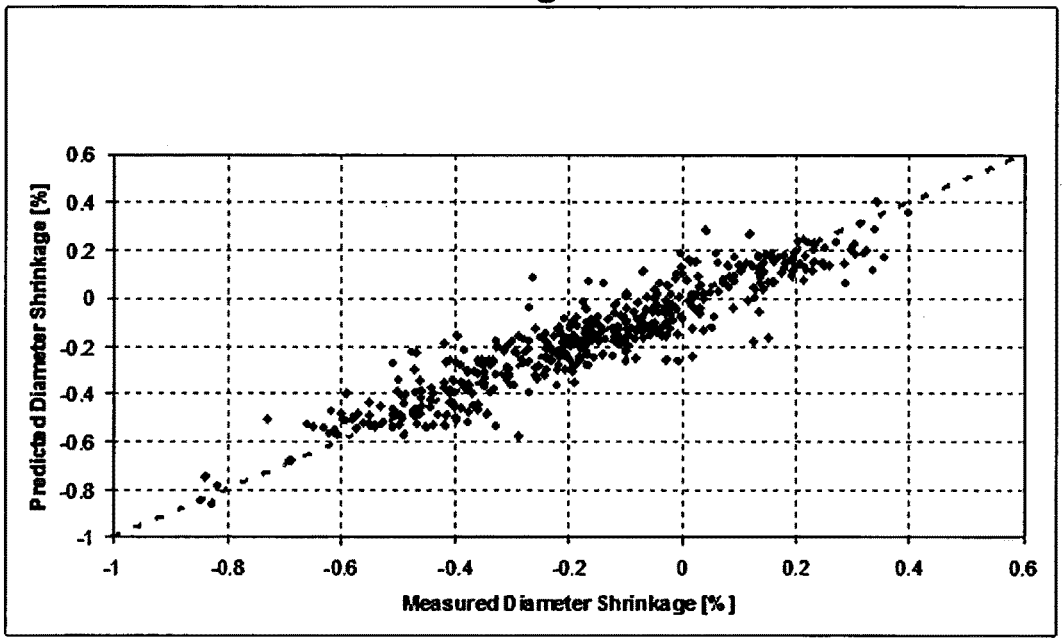

FIGS. 6A and 6B, graphically illustrate the relation of expected shrinkage in the diameter of the fired ceramic article compared to actual measured diameter shrinkage. Data reduction using principal component analysis (PCA) was significant for using curves as predictors. A classical regression method was initially helpful in defining and refining which predictors should be followed. A classical regression used, for example, 22 variables having all XiXj interactions and squares, to provide the following: RMSE=16.5%; Press=50.4%; $R^2$=55.5%; and $R^2_{Adj}$=52.9%. A neural networks method included non-linear relationships and further improved initial shrinkage correlations. A neural network used, for example, 22 variables having 6 neurons to provide the following: RMSE=8.7%; Press=13.2%; $R^2$=87.1%; and $R^2_{Adj}$=81.9%.

A typical batch sheet for the aluminum titanate ceramic source composition is listed in Table 1, and can be a starting point for batch compositions having a fine particle size graphite formulation. The level of fine graphite in the batch can be changed (i.e., added or subtracted) to compensate for expected shrinkage shifts. Additional fine particle size graphite can be added to the batch to increase shrinkage and to counteract a drop in expected shrinkage. Conversely, fine particle size graphite can be removed or subtracted from the batch, i.e., a reduced amount or an amount left out the batch recipe, or other ingredients can be, for example, increased, to effectively decrease shrinkage and to counteract a rise in expected shrinkage. For this method to be implemented in large scale manufacturing, the standard "home" composition can contain some amount of fine particle size graphite to allow for flexibility in both shrinkage directions. FIG. 3 shows a flow chart illustrating the formulation method.

TABLE 1

Batch sheet for an aluminum titanate composition having a blend of two graphite sources having different particle size distributions.

|  | Material | Wt % |
|---|---|---|
| Inorganics (100%) | Silica quartz | 10.31% |
|  | SrCO₃ | 8.10% |
|  | CaCO₃ | 1.39% |
|  | Aluminum Oxide | 49.67% |
|  | Titanium oxide | 30.33% |
|  | La₂O₃ | 0.20% |
| Pore Former (Super-addition to Inorganics) | Coarse Graphite | 3.50% |
|  | Native Pea Starch | 8.00% |
|  | Fine Graphite | 1.00% |
| Methocel/Soap(Super-addition to Inorganics + Pore Formers) | hydroxypropyl methyl cellulose (a blend of K and F Methocels) | 3.00% |
|  | hydroxypropyl methyl cellulose (Methocel F240) | 1.50% |
| Liquid Organics (Super-addition to Inorganics + Pore Formers) | Tall Oil L5 | 1.00% |
|  | Batch Water | 15.60% |

In embodiments, one exemplary aluminum titanate composition of the disclosure can have, for example, about 50% porosity and a 13 mil web thickness when prepared using a Methocel F240. In embodiments, another exemplary aluminum titanate composition of the disclosure can have, for example, about 45% porosity and a 10 mil web thickness when prepared using a blend of K and F Methocels. In embodiments, one exemplary aluminum titanate composition of the disclosure can be, for example, prepared using a mixture of Methocel F240 and a blend of K and F Methocels.

In embodiments, the coarse graphite pore former particle size distribution properties can be, for example: D10 9 to 13 microns; D50 35 to 45 microns; and D90 80 to 120 microns. In embodiments, the fine graphite pore former particle size distribution properties can be, for example: D10 1 to 3 microns; D50 3 to 5 microns; and D90 6 to 8 microns.

Extrusion experiments using graphite as a shrinkage control additive were accomplished in a CelPro laboratory extruder. The entire particle size distribution of the graphite was purposely changed to affect shrinkage. Shrinkage did change with large scale graphite moves (i.e., particle size distribution changes) but other properties, such as % porosity and CTE, remained unchanged. For this experiment, surface area (m² per gram) and porosity was used as a surrogate for particle size as shown in FIGS. 4 and 5, respectively, since there is a close correlation between the graphite particle size properties and the resulting fired ceramic's internal pore structure.

Other shrinkage control strategies have been previously investigated and developed by Corning, Inc. The strategies generally fall into two categories: passive control, and active control. Passive control strategies, i.e., strategies that seek to lessen the magnitude or retard the rate of change of shrinkage, can include, for example, ensuring incoming raw materials are very consistent, particularly $Al_2O_3$, along with blending raw material lots together to dampen any changes of a new starting batch material. Active control strategies can include, for example, sodium additions to the batch to counter act "natural" shrinkage variation and as described in the present disclosure.

Example 1

Predicting Shrinkage

To predict shrinkage, statistical techniques were used based on raw material sample characteristics, specifically particle size. First, a sample of every powder raw material ingredient is obtained from the batch house and cataloged. Ideally, the resulting product is within a suitable fired product specification. After dispersing and de-agglomerating each powder raw material, the particle size property was measured by, for example, laser light scattering (e.g., Microtrac or CILAS).

An example procedure for sample preparation for Microtrac particle size measurements can include, for example: 1) obtaining a particle sample; 2) loosely mixing the sample by repeatedly turning over or rolling the sample container; 3) adding a small amount of sample (e.g., about 0.05 grams) directly to the sample bath on a Microtrac instrument; 4) adding about 3 mL of a 5% aqueous Triton-X solution to the vessel containing the graphite particle sample; 5) sonicating the sample at 50 watts for 35 seconds; 6) verifying that obscuration is within the allowable machine limit; and 7) begin the particle size measurement process.

The full curve incremental data was then analyzed by the principal components analysis (PCA) technique which transforms the data from about 40 to 100 numbers (set 1 or original variables) to about 4 to 5 numbers (set 2 or principal components). Both number sets accurately describe the whole curve. These principle component numbers along with water call (i.e., added water) are then inserted into the calculation, for example, an empirical or neural net, as predictors. The calculation produces a response of the expected shrinkage.

Principal component analysis (PCA) is a mathematical procedure that uses an orthogonal transformation to convert a set of observations of possibly correlated variables into a set of values of linearly uncorrelated variables called principal components. The number of principal components is less than or equal to the number of original variables. This transformation is defined in such a way that the first principal component has the largest possible variance (that is, accounts for as much of the variability in the data as possible), and each succeeding component in turn has the highest variance possible under the constraint that it be orthogonal to (i.e., uncorrelated with) the preceding components. Principal components are guaranteed to be independent only if the data set is jointly normally distributed. PCA is sensitive to the relative scaling of the original variables. Alternative names for PCA are the discrete Karhunen-Loève transform (KLT), the Hotelling transform, or proper orthogonal decomposition (POD).

The disclosure has been described with reference to various specific embodiments and techniques. However, it should be understood that many variations and modifications are possible while remaining within the scope of the disclosure.

What is claimed is:

1. A method for manufacturing ceramic articles, the method comprising:
    extruding green bodies of constant size, the extruding comprising:
        extruding a first green body from a first mixture comprised of a first blend of an inorganic component and a pore former component, the pore former component being comprised of a fine pore former ingredient from a first source and a coarse pore former ingredient from a second source, wherein the D10 of the coarse ingredient is greater than the D90 of the fine ingredient, and
        extruding a second green body from a second mixture comprised of a blend of the inorganic component, the fine pore former ingredient in a different amount compared to the first blend, and the coarse pore former ingredient in the same amount as in the first blend; and
    firing the first and second green bodies, wherein, upon firing, the first green body is formed into a first fired ceramic article having a first porosity and a first shape, and the second green body is formed into a second fired ceramic article having a second porosity which is substantially the same as the first porosity and a second shape which is different from the first shape.

2. The method of claim 1 wherein a diameter of the second fired ceramic article is different from the diameter of the first fired ceramic article.

3. The method of claim 1 wherein the fine pore former ingredient produces fine pores during the firing, and the resulting fine pores completely sinter away during firing.

4. The method of claim 1 wherein the fine pore former ingredient produces fine pores during the firing that affect shrinkage of the resulting fired ceramic body, and the resulting fine pores completely sinter away during firing.

5. The method of claim 1 wherein the fine pore former ingredient comprises graphite.

6. The method of claim 1 wherein the coarse pore former ingredient comprises graphite.

7. The method of claim 1 wherein the coarse pore former ingredient comprises graphite having a particle size distribution with a D10 of 9 to 13 microns.

8. The method of claim 1 wherein the fine pore former ingredient comprises graphite having a particle size distribution with a D90 of 8 microns or less.

9. The method of claim 1 wherein the fine pore former ingredient comprises graphite having a particle size distribution with a D90 of 8 microns or less, and the coarse pore former ingredient comprises graphite having a particle size distribution with a D10 of 9 to 13 microns.

10. The method of claim 1 wherein the first mixture comprises at least one of an aluminum oxide source, a silica source, a titanium oxide source, and a lanthanum oxide source.

* * * * *